Sept. 12, 1939.                R. E. RICE ET AL                2,172,758
                            STATISTICAL CARD PUNCH
                              Filed July 1, 1938          11 Sheets-Sheet 1

INVENTORS
RAYMOND E. RICE
WALTER F. KELLEY
BY *H. A. Sparks*
ATTORNEY

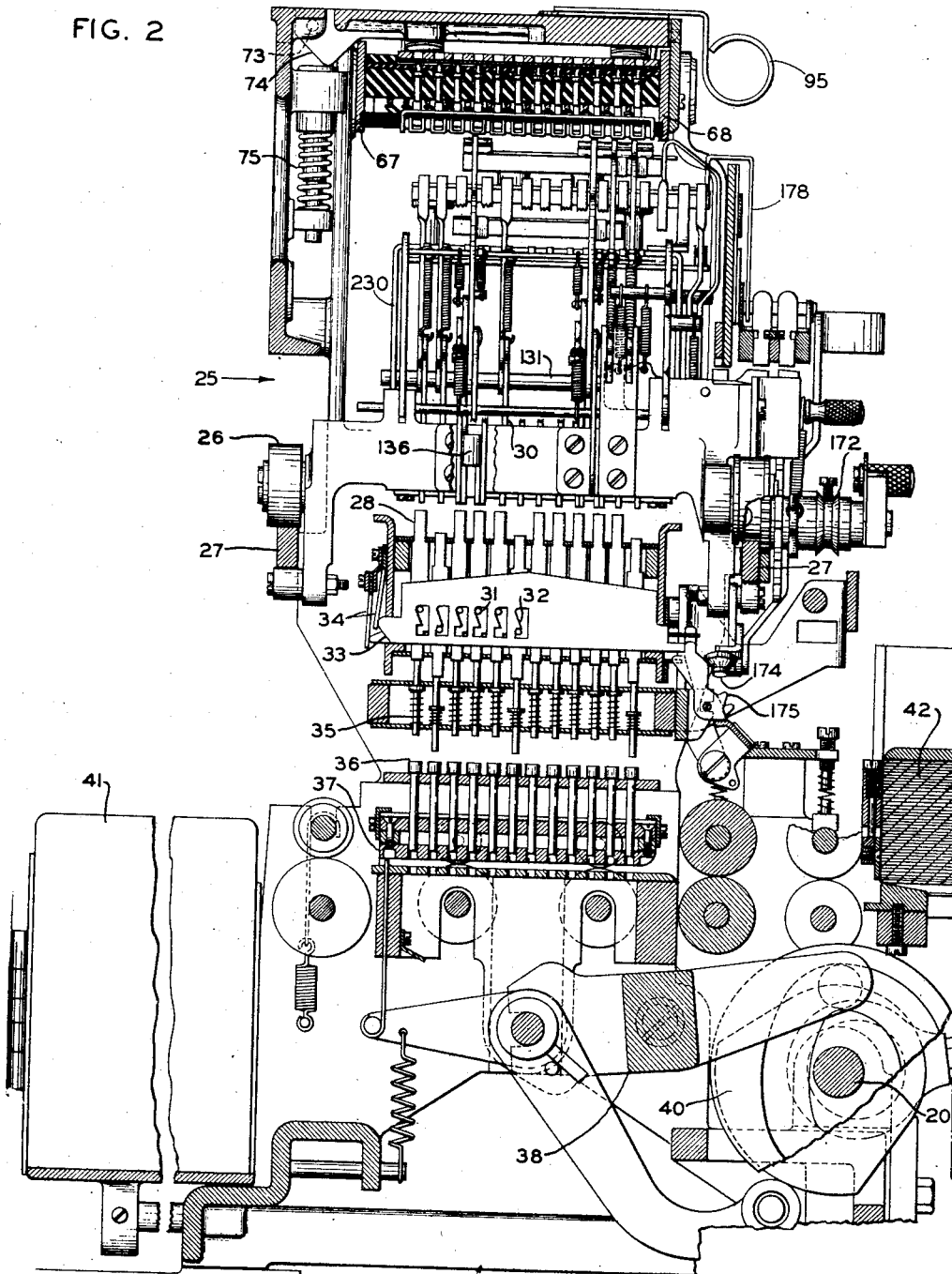

Sept. 12, 1939.    R. E. RICE ET AL    2,172,758
STATISTICAL CARD PUNCH
Filed July 1, 1938    11 Sheets-Sheet 3
FIG.4
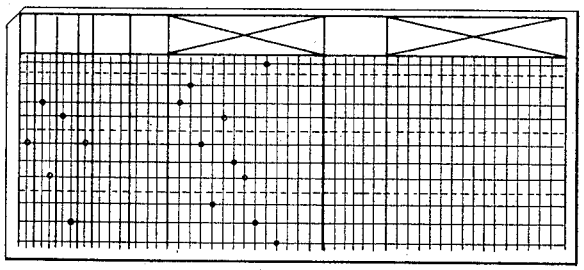
MASTER CARD
81 →
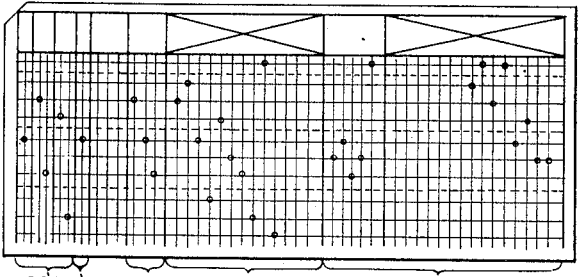
DUPLICATE CARD
232 →
233  234  235  236  237
FIG.3
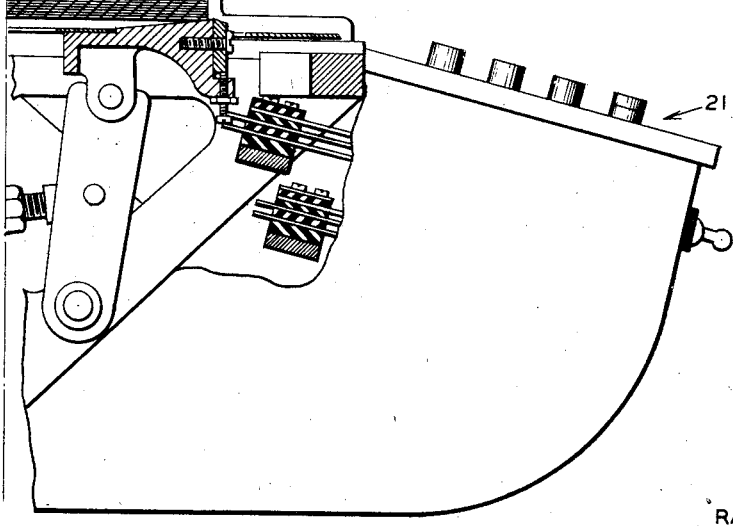
INVENTORS
RAYMOND E. RICE
WALTER F. KELLEY
BY *H. A. Sparks*
ATTORNEY Sept. 12, 1939.    R. E. RICE ET AL    2,172,758
STATISTICAL CARD PUNCH
Filed July 1, 1938    11 Sheets-Sheet 5

INVENTORS
RAYMOND E. RICE
WALTER F. KELLEY
BY *W. A. Spark*
ATTORNEY

INVENTORS
RAYMOND E. RICE
WALTER F. KELLEY
BY *H. A. Spark*
ATTORNEY

Sept. 12, 1939.    R. E. RICE ET AL    2,172,758
STATISTICAL CARD PUNCH
Filed July 1, 1938    11 Sheets-Sheet 7

INVENTORS
RAYMOND E. RICE
WALTER F. KELLEY
BY *W. A. Sparks*
ATTORNEY

Sept. 12, 1939.   R. E. RICE ET AL   2,172,758
STATISTICAL CARD PUNCH
Filed July 1, 1938   11 Sheets-Sheet 8

INVENTORS
RAYMOND E. RICE
WALTER F. KELLEY
BY W. A. Spark
ATTORNEY

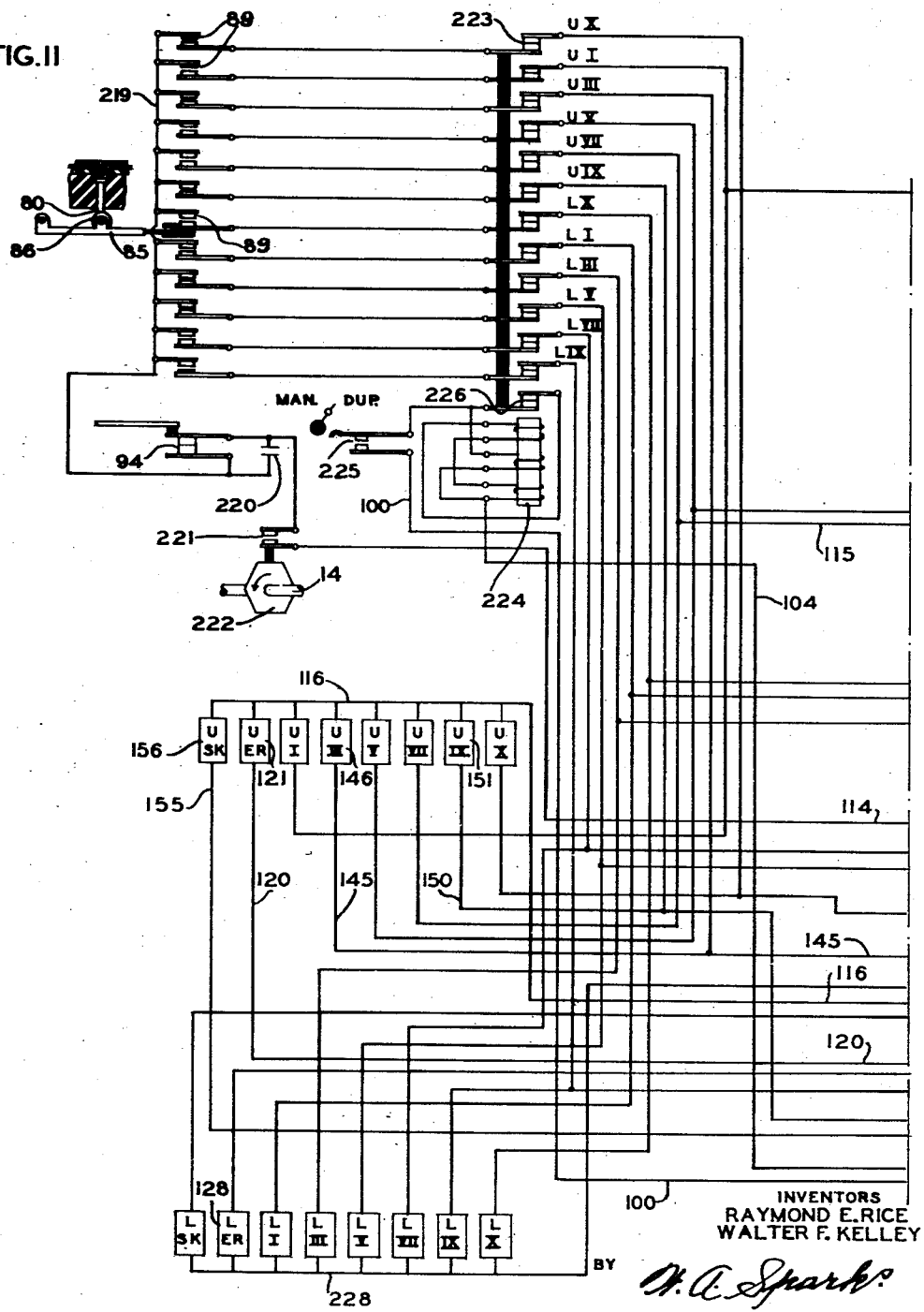

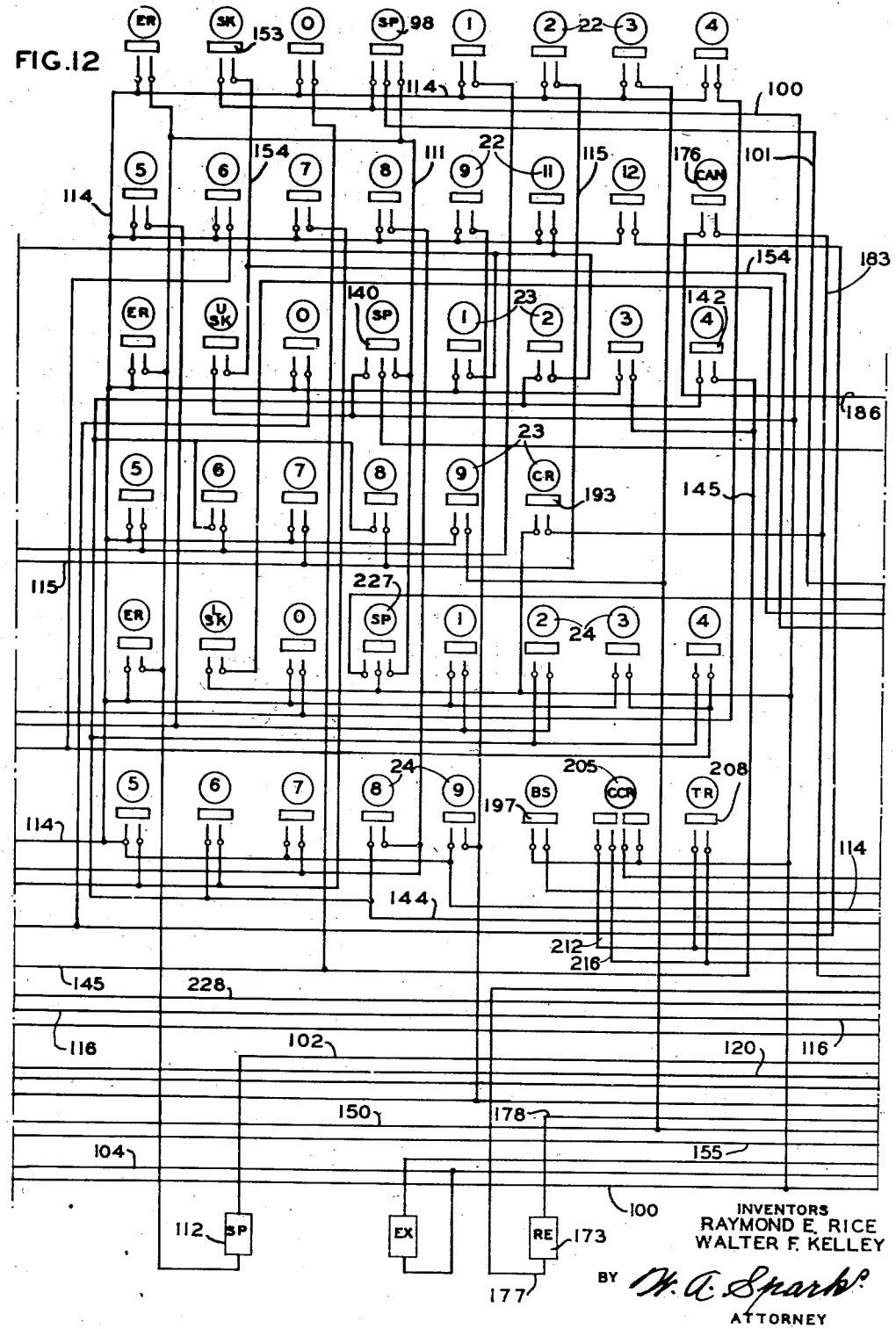

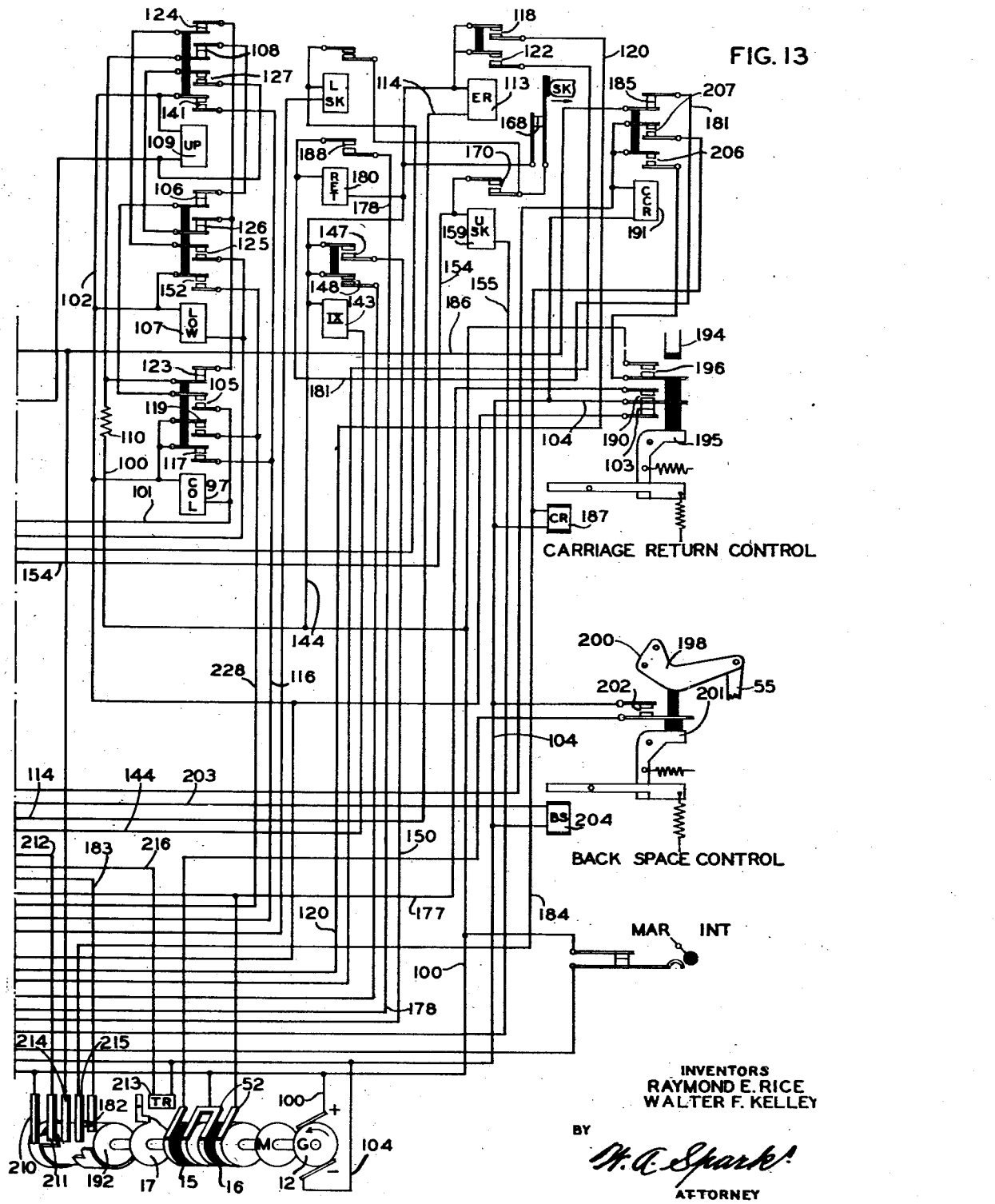

Patented Sept. 12, 1939

2,172,758

UNITED STATES PATENT OFFICE 2,172,758

STATISTICAL CARD PUNCH

Raymond E. Rice, Brooklyn, and Walter F. Kelley, Whitestone, N. Y., assignors to Remington Rand Inc., Buffalo, N. Y., a corporation of Delaware Application July 1, 1938, Serial No. 216,942

8 Claims. (Cl. 164—113)

This invention relates to statistical card punches, and more particularly to punches which reproduce cards with data punched therein corresponding to all or to part of the data included in a master card.

Duplicating and reproducing card punches as now constructed, while highly efficient for the purposes for which they are designed, are at present limited in their flexibility of control. Patent No. 2,004,208, issued to W. W. Lasker, discloses an efficient duplicating punch which will perforate a new card in exact conformity with the master card, but is lacking in means for permitting the substitution of new data for the old.

The present invention adapts a duplicating means to a standard card punch, with means for progressively copying data from a master card and setting up this data in a set bar field which will later be used to actuate the punch die, with the additional means for stopping this progressive action whenever a blank column is sensed on the master card. By appropriate switching means the machine may be converted into a standard punch to set up data in the usual manner.

The standard Powers punch of commerce has been described in detail in other patents, hence only a general description of this part of the present invention will be given here. Patents Nos. 1,868,111, 1,985,101, 2,044,707, 2,044,708 and 2,124,178, all issued to W. W. Lasker, give detailed descriptions of all the parts of a standard punch and the various operations performed by them.

The present invention which combines all the operations of a standard punch with a duplicating means, has a wide application in statistical work, where a date, stock number or account number and other like data are to be included in the punched data for a series of punched cards which otherwise differ from each other.

The object of the invention is to provide a duplicating machine which will punch any number of cards exactly like a master card.

Another object of the invention is to provide a duplicating punch which may be converted into a standard punch by a single switching means.

Another object of the invention is to provide a punch mechanism which will be progressively operated by a master card as long as there is data in the master card to be reproduced and will automatically stop when a blank portion of the master card is reached.

Still another object of the invention is to provide a punch mechanism which will transmit data from a master card to a set-up field or from a manual keyboard, interchangeably operated by either, and at the end of such set-up operations, punch a card with the accumulated data therein.

Other objects and structural details of the invention will be apparent from the following description when read in connection with the accompanying drawings, wherein Fig. 1 is a front view of the complete reproducing punch;

Fig. 2 is a sectional view taken on line 2—2 of Fig. 1 of part of the machine taken from the left-hand side and illustrating the master card compartment, setting pins, punch die, and some of the operating mechanism;

Fig. 3 is a continuation of Fig. 2 showing the card magazine and keyboard;

Fig. 4 shows two cards, a master and a duplicate, with indicated punched data therein;

Figs. 11, 12, and 13 are schematic wiring diagrams, which, if placed side by side in the order named, will result in the complete wiring diagram of the machine.

General punch assembly

Figure 1:
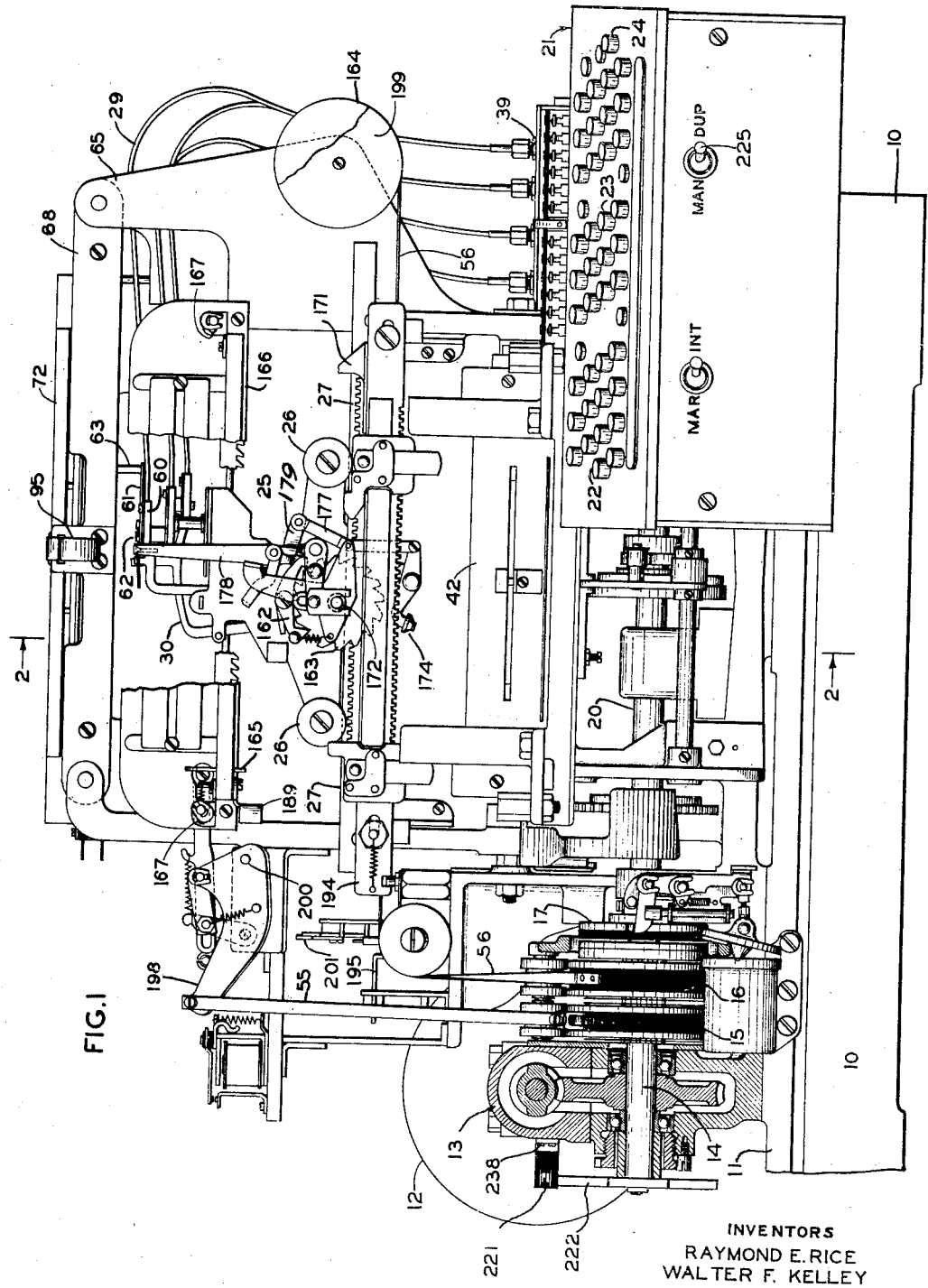

The general assembly is illustrated in Fig. 1 where a main supporting frame 10 holds the cooperating units, and a sub-frame 11 holds a motor generator unit 12 and a speed reduction unit 13. Mounted directly on a shaft 14 of the speed reduction unit 13 are three clutches 15, 16, and 17. The first clutch 15 is for causing backspace of the carriage, the second 16 is for carriage return and the third 17 is to operate the punch die and the card handling mechanisms through the media of shaft 20 and other mechanical devices.

A keyboard 21 (Figs. 1 and 3) is mounted in front of the machine and contains three sets of numeric keys, one set 22 being for the 45-column code, the second set 23 to record in the upper zone of the card using the 90-column code and the third set 24 to record in the lower zone, also using the 90-column code. The basic principles of operation do not depend on the code nor the keyboard used and it is to be understood that any other code or any other suitable keyboard may be substituted in place of those shown without altering the spirit or scope of the invention.

Figure 5:
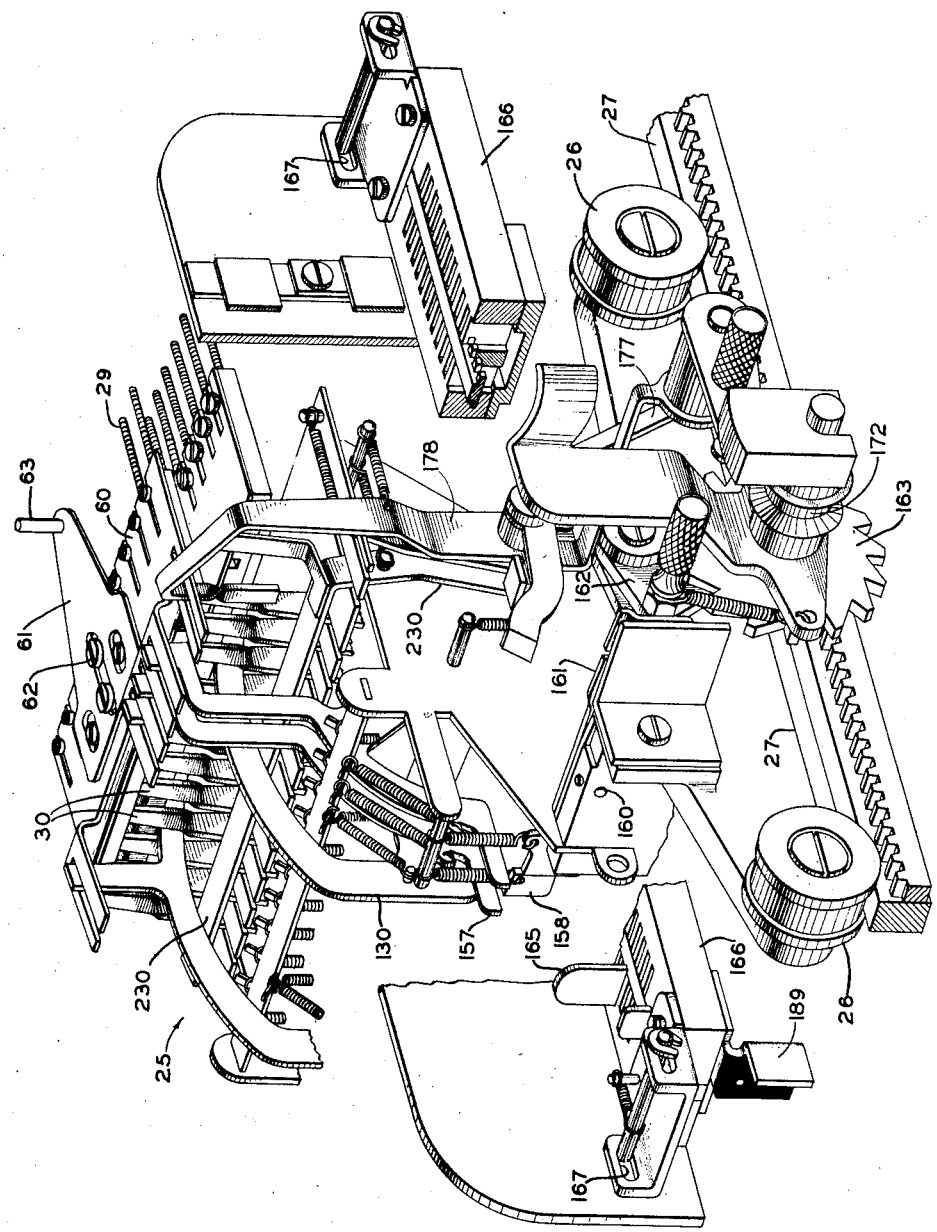
Fig. 5 is an isometric view of the setting carriage showing some of its operating features.

A setting carriage 25 which is shown in more detail in Figs. 2 and 5, is mounted on rollers 26 which track on rails 27, allowing the carriage to move along the length of the punch over a set-bar field. The movable carriage is provided with Bowden wire-operated setting levers 30 which engage the ends of set-bars 28 and depress them in accordance with the data to be included in the punched card.

The setting levers 30 are operated by Bowden wires 29 which, in turn, are operated by a bank of solenoids 39 controlled by the keys in the keyboard 21.

To produce a set-up in the set-bar field, the set-bars 28 are depressed the full extent of their allowable travel so that the extrusions 31 pass beyond the cam faces 32 in the locking slides 33 and are thereby locked in their depressed position until released by a lateral movement of the locking slides. The locking slides 33 are resiliently held to one side by flat springs 34, while the setting-bars are strained upwardly by the helical springs 35 positioned around the bars near their lower extremity.

There are two locking slides 33 for each column of set-bars one of which is located on one side of the bars and controls the first six bars for upper column 90 column work and the other on the other side for the last six bars which are effective for lower 90 column punching.

When the machine is used as an ordinary punch controlled by the keyboard, the set-up is made, one column at a time, by the setting carriage starting at the left-hand margin and moving across the field to the right-hand margin. The total set-bar field contains 540 set bars in the standard machine, each bar positioned above a punch 36. When the data has been fully set up, the clutch 17 is actuated and a die 37 is moved upwardly by means of a lever 38, one end of which carries a roller which engages a clutch-driven cam 40. As the punch die is raised, the punches under the set-bars which have not been latched down, are lifted by the card on the die and no perforation is made. The punches under the set-bars which have been latched down will be stopped by the lower extremities of said set-bars, and forced through the card, indicating data therein. After the punch die is lowered, the card is fed out of the punch and deposited in a pocket 41 while another card is picked from the bottom of a stack 42 and fed into the punch preparatory to another setting and punching operation.

Also mounted on shaft 14 are two electromagnetic clutches 15 and 16. These clutches are used for back-space and carriage return respectively and are fully described in the patent issued to Walter F. Kelley, No. 2,160,153, dated May 30, 1939.

The driving shaft 14 (Fig. 1) is connected directly to the speed reduction gear 13 and rotates continuously when the machine is in use. By means of electromagnetic windings enclosed in the clutch drums, frictional engagement is produced between the shaft member 14 and the drums 15 and 16. Means for energizing these windings is provided for by a pair of slip rings with contacting brushes and associated power control circuit. Back-space link 55 and carriage return ribbon 56 are attached to the insulated portion of the clutch drums by hinged clamps. Operation of these two clutches will be hereinafter described in connection with the wiring diagram.

Fig. 5 shows the setting carriage with many of the parts broken away to better illustrate the control features and the method of attaching the Bowden wire housings 29 to the carriage assembly. Secured to a top plate 60 is a triangular plate 61, held thereon by adjustable screws 62 and having riveted to its apex, a perpendicular pin 63. This pin engages a socket in another member to be described hereinafter.

*Duplicating attachment*

Figure 6:
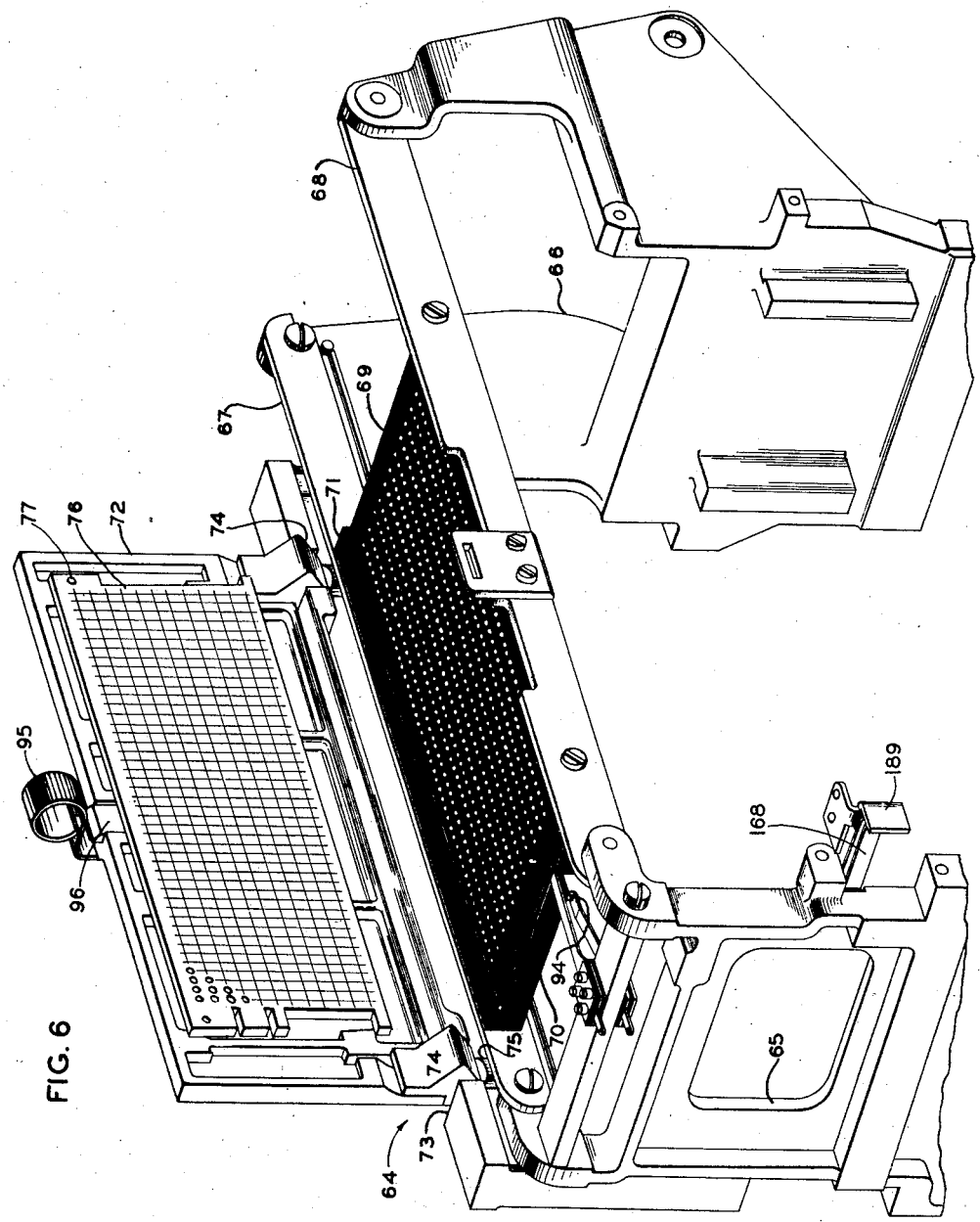
Fig. 6 is an isometric view of the master card sensing compartment with the cover open and the compartment empty.

Fig. 6 shows an isometric drawing of a master card compartment 64. Two metal castings 65 and 66, integrally formed with the main punch supports, act as supporting means for this adaptation. Two longitudinal bars 67 and 68 attached at their extremities to the metal castings, hold a flat plate member made up of two insulating sheets 69 and 70 and having a plurality of holes formed therein, each hole corresponding to a perforation position on the standard statistical card which is illustrated in Fig. 4. Suitable guides 71 are provided so that a card, when placed on the insulated plate, will have its punched data holes in register with the holes in the plate.

A hinged cover plate 72 is provided to hold the master card in place during the duplicating operation and permit its quick removal. Its hinges 73 are equipped with cam faces 74 and cooperating spring members 75 which hold the cover open at an angle of about 45 degrees, while master cards are being interchanged.

On the inside of the cover 72, an auxiliary perforated plate 76 is mounted on studs 77, which hold it in spaced relation to the cover. Mounted between the perforated plate 76 and the cover 72 are two flat springs 78 which are fastened to the cover by means of screws and press against the plate with their free ends. This resilient mounting of the plate permits a better adjustment during the assembly and makes possible an accurate card position during the sensing operation.

Figure 8:
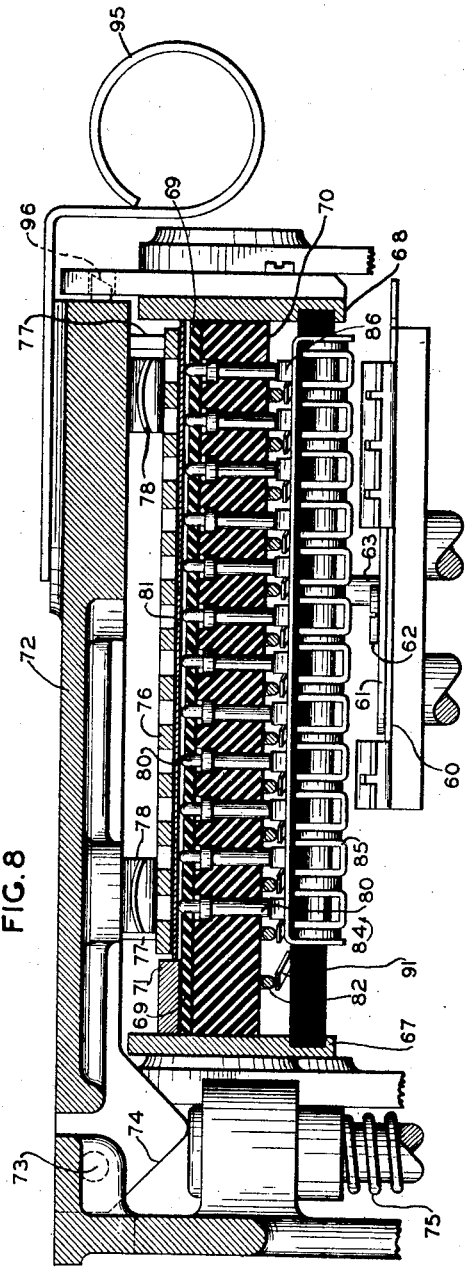
Fig. 8 is an enlarged sectional view of Fig. 7 taken along the line 8—8, illustrating the sensing mechanism.

As disclosed in more detail in Fig. 8, the insulator plate is made up of two components, an upper insulating sheet 69 having holes for the upper ends of sensing pins 80, and a lower insulating sheet 70 which is formed with larger holes for the lower ends of the sensing pins and an enlarged cylindrical cavity in its upper face to accommodate the pin collar and accurately determine its vertical freedom of motion.

Secured to the bottom face of the insulating sheet 70 are thirteen copper bars 82, each running the entire length of the plate, parallel to each other and terminating at the right-hand edge (Fig. 7) of the insulator plate in projections 83 to provide a convenient means for electrical wiring.

The side bars 67 and 68 are each formed with a groove near their lower edge and into these grooves a carriage 84 is slidably mounted. Twelve levers 85 are pivotally mounted on this carriage each with a rolling wheel 86 which extends through the carriage block and makes contact with the lower ends of the sensing pins 80. An extended portion of each of the levers 85 fits into a slotted insulated member 87 whcih is attached to the free end of a flat contact spring 88.

As the carriage 84 is moved along, the contact springs 88 press the levers 85 upwardly so that the rollers 86 are strained against the lower ends of the sensing pins 80. If there is no hole in the card the sensing pin will not rise and the roller and its lever will ride under it without upward movement, but, if there is a hole in the card, the upper end of the sensing pin will enter the hole and allow the roller and lever to be displaced upwardly an amount sufficient to close a contact 89. In this manner an electrical contact is made whenever a hole is sensed in the master card 81. Electrical connection might be made to the contact springs directly but this would necessitate long loops of flexible wire which would have to move with the carriage as it was stepped along. To obviate this the thirteen copper bars are used, each with its separate sliding contactor 91, one bar connected to the positive generator lead and the other bars connected directly to the solenoids which operate the set-up levers. The complete circuit of these contacts and their detailed operation will be described under Circuits.

The sliding carriage 84 is moved along by the pin 63 which fits into a hole in the insulator plate thereby maintaining an exact relation between the carriage 84 and the setting carriage which is directly below it. The sensing pins must be spaced apart an amount equal to the column spacing in order to register properly in the card holes as must also the set-bars in the set-bar field. Hence, if the sensing carriage is properly adjusted so that the wheels 86 are directly under the first column of pins, when the setting carriage is directly over the first column of set-bars, the remaining components of the two fields will be in correct register.

Figure 7:
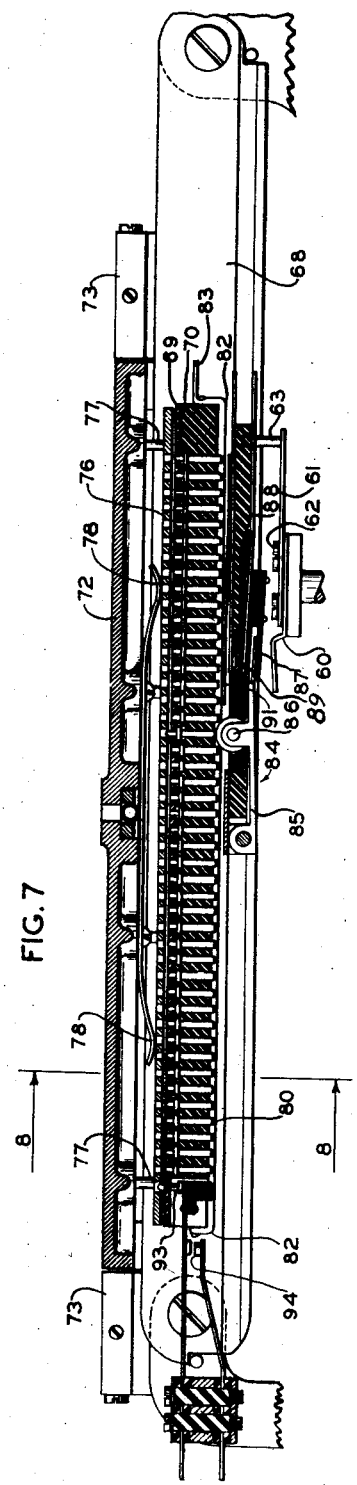
Fig. 7 is a sectional view of the master card sensing mechanism taken from the front.

In addition to the contact switches for the sensing means, there is another contact switch 94 which is included in the mechanism for protective measures. It is connected in series with the positive generator lead and when its contacts are broken the automatic sensing mechanism is disabled and no duplication is possible. As is shown in Fig. 7 one leaf of this switch extends under the insulator plate 69 and engages a pin 93 which extends upwardly through the plate and is displaced downwardly making the contacts when a card is properly seated in the compartment. Closing the cover 72 without a card, or with the cards improperly placed, leaves the contacts open and no sensing is possible. The cover 72 is provided with a handle 95 and a spring latch mechanism 96 which provides the same card clearance each time the cover is closed.

Figure 9:
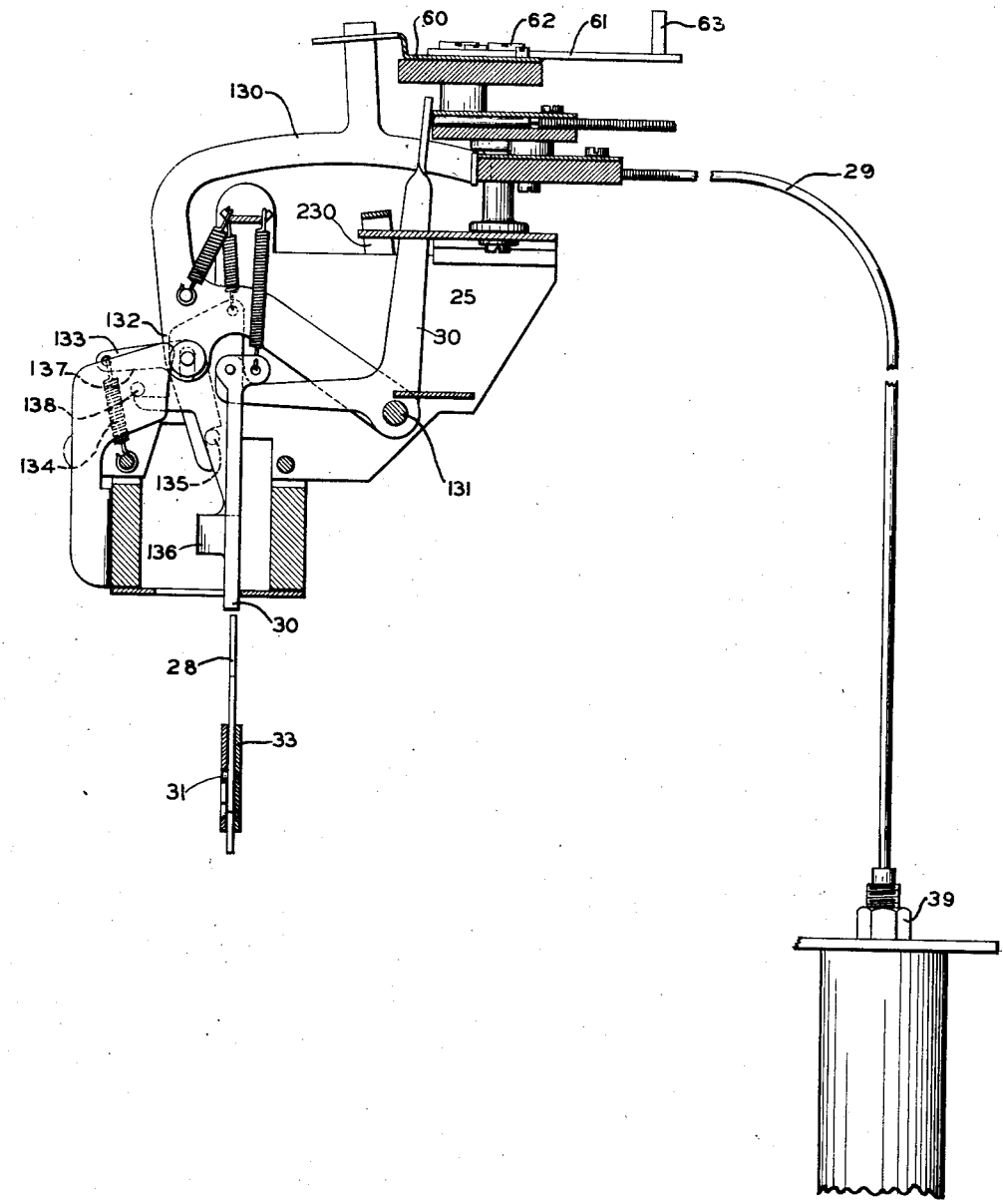
Fig. 9 illustrates the erase mechanism with its associated Bowden wire and solenoid.
Figure 10:
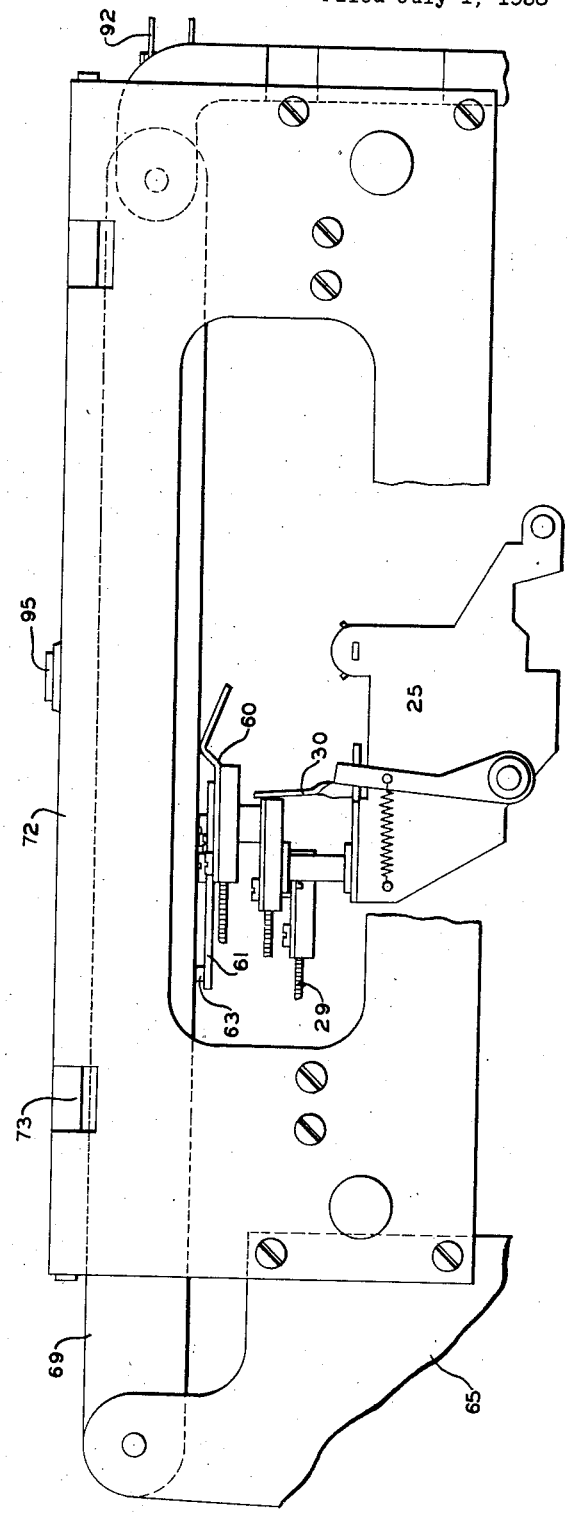
Fig. 10 is a rear elevational view of the master card compartment.

Fig. 9 illustrates part of the setting carriage and shows in particular the erase mechanism, a full and detailed description of which will be found in the patent issued to W. F. Kelley, No. 2,160,152, dated May 30, 1939. This figure indicates the mechanical offset between the sensing carriage pin 63 and the set bar 28.

Circuits

The operating circuits of the present invention naturally fall into two classes, first, the circuits used by the keyboard for the normal operation of the card punch, and, second, the circuits and controls associated with the automatic sensing chamber when a card or part of a card is being duplicated.

The keyboard circuits are practically the same as used in similar standard punches. When it is desired to punch data into a card using the 45 full column numeric code, the full column keys 22 are used. These are shown in the wiring diagram (Fig. 12) in the two upper rows.

In order to punch data in the full column or "45" code, it is first necessary to close the contacts controlled by the column relay 97 (Fig. 13). This is done by depressing the space key 98 in the full column series. The contacts closed by this key complete several circuits, one of which may be traced from the positive generator lead 100 to the contact points under the space key 98, thence over lead 101 through the winding of column relay 97, thence over lead 102 to the closed contacts 103 of the carriage return control assembly and thence to the negative generator lead 104. This circuit causes the column relay 97 to be actuated, breaking one contact 123 and making contacts 105, 119, and 117. One of these contacts 105 completes a holding circuit from the relay winding (lead 101) to the contacts 106 of the lower relay 107 and, thence to contacts 108 of the upper relay 109, thence through a resistance 110 and to the positive line 100. This circuit holds the column relay in its actuated condition after the space key has been released, and it will stay in this condition until either the upper or lower space key is depressed.

Another circuit completed by the space key 98 is from the positive lead 100 to the right-hand contact under the space key, over lead 111 to the space solenoid 112, thence to the lead 102, through the contacts 103 and thence to the negative lead 104. This circuit causes the solenoid, by means of its attached Bowden wire, to effect a spacing action to the setting carriage. Since it is not always convenient to start a data card with a blank space, the present punch carriage has been designed with an extra space to the left of the usual starting position. Then the depression of any space key moves the carriage into the starting position and definitely selects the desired code circuits to be used.

With the column relay 98 actuated, a series of keys in the column series may now be depressed. If the "2" key is depressed a circuit is completed from the positive generator over leads 100 and 144, through the winding of erase relay 113, then over lead 114 to the "2" key contacts. From the key, the circuit continues over lead 115 through the winding of the U. VII solenoid and thence to the upper bus lead 116 and thence back through contacts 117 on the column relay 97, over lead 102, through the contacts 103 to the negative lead 104. This circuit causes the solenoid U. VII to be actuated which sets the proper set-bars to indicate the numeral "2" in the card. It should be noted that this circuit is only possible when the column relay 97 is in its actuated position and when the carriage return control is not operating.

The three relays, column 97, lower 107, and upper 109, each have holding circuits which are interconnected with the contact points of the other two in such a manner that only one relay may be held operated at a time. For example, if the column relay is in its actuated position, the holding circuit extends from the positive lead 100, through the resistance 110 and thence through three pairs of contacts 108, 106, and 105 and back through the relay winding 97 to negative as described above. These contacts are in conducting position only when the column relay is actuated and the other two are normal. Actuating either one of the other two, such as the lower relay 107, opens the column holding circuit, through contacts 106 allowing the column relay to be normalized and closes a similar holding circuit which keeps the lower relay 107 actuated through three other contacts 125, 124, and 123 having the same properties as those in the column holding circuit. In a similar manner, the contacts 127, 126 and 123 are in series with the holding circuit for the upper relay 109.

Since the erase relay 113 is actuated and its two armature contacts closed when the "2" key is depressed, there will result two other circuits which are as follows: From the positive lead 100, through contacts 118 of the erase relay 113 over lead 120, through the winding of the upper erase solenoid 121, then over lead 116 through contacts 117 of relay 97 which are closed because the column relay is operated, thence over lead 102 and through contacts 103 to negative lead 104.

The result of this circuit is the actuation of the upper erase solenoid which, acting through its Bowden wire, erases the existing set-up data in the upper part of the column under the carriage. The erasing action is mechanically timed to occur just before the regular data is transferred to the set-bars so there will be no interference between the two actions.

By tracing the circuit through the contacts 122 of erase relay 113, it will readily be seen that this circuit is similar in every way to the circuit which causes the erasing in the upper field. The mechanical action of the erase mechanism has been fully described in Patent No. 2,160,152, issued May 30, 1939, to W. F. Kelley and it is not necessary to describe it in detail here. Fig. 9 illustrates the erase mechanism, partly in section, showing the main operating features. A solenoid case 39 houses the erase solenoids and a Bowden wire 29 communicates its action to a lever 130 which is pivoted on a cross shaft 131 and is provided with an extended portion 132 to which is pivotally attached a bell-crank tripping lever 133. This tripping lever is held in place by a spring 134 and engages a pin 135 attached to an erase bar 136. When the lever 130 is rotated by the Bowden wire 29, the tripping lever 133 is forced downwardly carrying with it the erase bar 136 and engaging two of the set-bars 28, forcing them down. The downward motion continues until the lower edge 137 of tripping lever 133 comes in contact with a pin 138, after which any further motion of the erasing lever 130 serves only to trip the lever 130 out of engagement with the pin 135 and the erasing bar springs back to its normal position. The pin 138 is so placed that the downward movement of the set-bars 28 is sufficient to cause the extrusions 31 (Fig. 2) to travel the full length of the inclines on the cam faces 32 but not to pass beyond their points. This action moves the locking slides 33 to the left, an amount sufficient to release all the set-bars which may have been locked down. The release of the erase mechanism is timed so that the set levers 30 may make a data set-up in the set-bar field at the same time the erasing is done.

To punch a digit in the upper zone of the card, the upper keys 23 are used. A different code is used for the 90-column card, some of the digits such as 2, 4, 6, and 8, requiring two holes instead of one. In order to explain the action of the upper set of keys, the circuits connected with the "4" key will be considered.

To start operations in the upper zone, the space key 140 must first be depressed in order to actuate the upper relay 109 and make contacts 141. Then when the "4" key 142 is depressed, a circuit is completed as follows: From the positive lead 100 through the winding of IX relay 143, and over lead 144 through the contacts of the "4" key 142, over lead 145 through the winding of the upper III solenoid 146, thence over lead 116 through contacts 141 on the upper relay 109 and back to the negative lead 104 by way of contacts 103. This circuit causes the actuation of the U. III solenoid and the subsequent latching down of the corresponding set-bar. When the IX relay 143 is actuated, both its contacts 147 and 148 are made, thereby completing other circuits. One of these starts from the positive lead 100, through contacts 147, over lead 150 to U. IX solenoid 151, and back over lead 116 to the negative terminal as before. The actuation of the U. IX solenoid causes another set-bar to be latched down so that there will be two holes punched in the card to represent the figure 4 in the upper field. If the circuit be traced through contacts 148 it will be found to end at open contacts 152 of lower relay 107 and, therefore, is inoperative.

Set-ups are made in the lower field in a similar manner to that described above and need not be detailed here.

Besides the spacing operations, the following functions may be controlled by the keyboard.

*Skip, column, upper, and lower.*—Depressing these keys advances the carriage to the next settable stop on the skip bar.

*Erase, column, upper and lower.*—These keys perform the same erasing action as described under the column set-up, except that no set-up is made.

*Cancel (Can).*—The cancelling operation consists in returning the setting carriage to either the margin or intermediate stop and cancelling all the set-up data in the set-bar field.

*Carriage return (CR).*—The setting carriage is returned to either of the stops without cancellation.

*Back space (BS).*—The setting carriage is moved to the left one space.

*Card carriage return (CCR).*—A card is punched with the data in the set field and delivered to the receiving pocket. Another card is picked from the stack in the supply magazine and rolled into the punch to be ready for another punching cycle. The setting carriage is also returned to one of the stops without cancellation.

*Trip (TR).*—This is the same as the card carriage return except that the data in the set-bars is cancelled.

The margin-intermediate (Mar-Int) switch is a small toggle switch on the front of the keyboard casing and controls circuits for causing the stopping of the setting carriage, marginal or intermediate, on all carriage return operations.

Depression of the skip key 153 in the column series completes a circuit from the positive lead 100 through the key contacts and over the lead 154, thence through the winding of the upper skip relay 159, and over lead 155 through the winding of the upper skip solenoid 156, and thence over lead 116 through contacts 117, over conductor 102 and through contacts 103 to the negative lead 104. Actuation of solenoid 156 causes its Bowden wire to move its associated lever 157, (Figs. 1 and 5) which engages another lever 158 pivotally mounted on a pin 160 and having a blocking nose 161. When the blocking nose is raised, it also lifts an escapement pawl 162 out of engagement with a toothed wheel 163 and so frees the carriage, allowing it to move to the right under influence of a spring driven drum 164. The carriage moves until the blocking nose 161 engages a tab stop 165 set in the skip bar 166, thereby stopping the carriage and moving the skip bar to the right a small amount as provided for by slots 167. Secured to the skip bar 166 is a lug 189 which cooperates with contacts 168. This motion of the skip bar opens the contacts 168 in the skip circuit and ends the operation as will be hereinafter set forth.

The skip operation takes an appreciable time and if the skip distance is long the key may be depressed for only a fraction of the time taken for its completion. For this reason a holding circuit is provided on the skip relay so that the positive lead 100 is connected over lead 144 through the skip breaker contacts 168, which are normally closed and the contacts 170 which are closed when the relay is actuated through the winding of relay 159 and thence to negative as described above. Hence, a momentary depression of the skip key is sufficient to complete the operation and the breaking of the contacts 168 by the motion of the skip bar will break the same holding circuit and return all relays and solenoids to normal. There are only two skip mechanisms provided on the punch as illustrated, one for the lower field and one for the upper or column fields. The lower skip mechanism works in the same manner as the upper.

Three erase keys are provided, one for column and one each for upper and lower. Each key actuates an erase solenoid which covers its designated field and also actuates the space solenoid, moving the setting carriage one space to the right. The erase action in the setting carriage is the same as explained in the description of the set-up operation.

*Cancel.*—When the cancel key 176 is depressed, the carriage is returned to either the marginal or intermediate stop and all the data within the scope of the carriage movement is erased from the set-bar field. The motive power for the carriage return operation is furnished by the electromagnetic clutch 16 (Fig. 1) pulling a tape 56 which is wound on a spring spool 199 and has a hook member 171 secured to its central portion, said hook member engaging a stud 172 on the setting carriage. The cancelling operation is caused by the actuation of a retract solenoid 173, which by means of its associated Bowden wire and lever member 178 and links 177 and 179, depresses a roller 174 which engages and rocks the retract levers 175 and unlatches all the depressed set-bars by an appropriate transverse movement of the locking slides 33, as clearly shown in Figs. 1 and 2.

Depression of the cancel key 176 causes three circuits to be completed, one energizes a retract relay 180 and the winding 181 of the carriage return control magnet, a second actuates the retract solenoid 173, and a third energizes the carriage return clutch 16. The first circuit may be traced as follows: From the positive generator over the leads 100 and 144 through the winding of the retract relay 180, over the lead 181 and then through the contacts 185 of the card carriage return relay 191, which is not actuated for this operation, thence over lead 186 to the cancel key 176, then over lead 183 to the contacts 182 between two leaves of the commutator assembly 192, thence over lead 184 to the winding of the carriage return magnet 187, which trips the carriage return control armature, and back to the negative lead 104.

The second circuit completed by the depression of the cancel key 176 is due to the closing of the armature contacts 188 of the retract relay 180. The circuit may be traced from the positive lead 100, over lead 144, through the winding of relay 180, through the contacts 188, over lead 178 through the winding of the retract solenoid 173, back over lead 177 through the contacts 190 which have been made due to the tripping of the carriage return control lever and thence to the negative lead 104.

The third circuit runs from the positive lead 100 through the winding of the electromagnetic clutch 16, brushes 52, over lead 177 thence through the contacts 190 and to the negative lead 104 as before.

*Carriage return.*—The carriage return operation is the same as cancel except that the retract solenoid is not actuated and no cancellation is effected. Depression of the carriage return key 193, completes a circuit from the positive lead 100, through the key contacts, over the lead 183, through the closed contacts 182 on the commutator assembly 192 over lead 184 through the winding of the carriage return relay 187 and thence to the negative lead 104. When the relay 187 operates, contacts 190 are made and current then flows from the positive lead 100 through brushes 52 to the clutch winding 16, over lead 177 through the contacts 190 and back to the negative lead 104 as before. The result is a simple carriage return to either margin or intermediate stop depending upon the setting of that switch. In all carriage return operations, the contact of the carriage with the designated stop produces a short lateral movement of the stop bar assembly 194 (Fig. 1) and thereby latches the pivoted member 195 in its normal position, breaking contacts 196 and 190 and making contacts 103. Since the carriage return clutch 16 is actuated through the contacts 190, the breaking of these contacts releases the clutch and the spring drum 199 draws the clutch and hook member 171 back to normal.

*Back-space.*—The back space operation moves the setting carriage to the left one space for each depression of the back space key 197, which actuates the magnet 204 which causes its armature to trip an arm 201 (Fig. 1) in turn closing contacts 202 through which the back space clutch magnet is actuated. The clutch 15 is similar in every way to the carriage return clutch except that the link 55 is a metal strip instead of a flexible ribbon. As the clutch is actuated, the link 55 is pulled downwardly rocking a bellcrank lever 198 on its pivot 200. The motion continues until the lower edge of the bell-crank 198 strikes the arm 201 opening contacts 202 and breaking the actuating circuit, thereby normalizing the entire mechanism. The result of this action is the movement of the setting carriage to the left an amount sufficient to cause the wheel 163 to turn counterclockwise to permit the pawl 162 to engage the next tooth, thereby executing one back space. The circuits involved may be traced as follows: From the positive lead 100 through contacts of the back space key 197, over lead 203 to the back space control magnet 204 and thence to the negative lead 104 thus tripping arm 201. Tripping this control latch closes the contacts 202 and completes another circuit from the positive lead 100, through the winding of the back space clutch 15, through the contacts 202 back to the negative lead 104. Breaking the contacts 202 stops the clutch action as described above.

*Card carriage return and trip.*—The card carriage return operation punches a card with the data set up in the set-bar field, and returns the carriage to one of the marginal stops without cancellation of any of the set-up data. The trip operation is the same except that the data is cancelled. Since the card carriage return operation does not cancel any data, the carriage return clutch may start its action at the same time the punching operation is started. The trip operation, however, must time the carriage return to wait until after the punching operation, so as not to disturb any of the set-up data while the perforations are being made.

The motive power for the punching is derived directly from the motor shaft and transmitted to the punching mechanism by means of a mechanical friction clutch 17. This clutch executes a single revolution and stops each time at exactly the same point when thrown out of engagement.

The card carriage return key 205 closes two sets of contacts. One set connects the positive lead 100 directly to the winding of the card carriage relay 191, whose other side is connected to the negative lead 104. Three contacts are secured to the armature of this relay, one 185 breaks when the relay is actuated and opens the circuit leading to the retract relay so there may be no cancellation. Two other contacts are made, one of which 206 acts as a holding circuit and is connected to the positive lead through the contacts 196 of the carriage return control mechanism. The other contact 207 closes a holding circuit for the magnet 187 from positive lead 100 through contacts 196 of the magnet 187, contacts 206 and 207 of relay 191 thence through the winding of magnet 187 and then to negative generator over lead 104. When the carriage is fully restored the bar 194 latches member 195 up and opens contacts 196 thereby opening the holding circuit for magnet 187.

The second set of contacts under the card carriage return key 205 is in parallel with the contacts of the trip key 208 and completes a circuit from the positive lead 100 to the feeder brush 210 on the commutator 192, to the brush 211, thence over lead 212 to the contacts under the trip and card carriage return keys, thence over lead 216 to the trip magnet 213 and back to the negative lead 104.

The actuation of the trip magnet 213 causes the clutch 17 to be engaged which rotates the commutator 192 and motivates all the apparatus which punches the card, delivers it to the receiving pocket 41 and feeds another blank card into the punch die 37. As the commutator 192 rotates, connection between brush 210 and 211 is broken, hence the trip magnet 213 is deenergized and its armature springs back into the path of the projection on the clutch. This action occurs after the projection on the clutch 17 has passed the armature catch.

The circuit which provides a delayed return of the setting carriage works in series with two of the brushes on the commutator and may be traced as follows: From the positive lead 100 over lead 144 through the winding of the retract relay 180, and then over lead 181 to the contacts 185 on the card carriage return relay 191 which is not actuated during this operation, thence over lead 186 to brush 214 on the commutator 192, then to brush 215 after the commutator has made three-quarters of a revolution, thence over lead 184 through the winding of the carriage return control magnet 187 and back to the negative lead 104.

The actuation of the retract relay 180 closes contact 188 and energizes the retract solenoid 173 over the circuit described above which causes cancellation and energizes the clutch 16 as before.

*Duplicating mechanism*

The wiring for the duplicating mechanism is shown in Fig. 11 where a series of twelve contacts 89 represents the contacts on the movable carriage 84 (Fig. 8). Each of these contact members is controlled by a pivoted lever member 85, on which is mounted a roller 86, as hereinbefore described. In Fig. 11 only one of these is indicated, there being twelve in the actual machine, each lever operating under one of the twelve data positions in a column. One terminal of these contacts is connected to a common lead 219 which acts as a feeder supply lead for the sensing assembly. In series with this lead the card switch 94 (Figs. 7 and 11) is arranged in such manner as to close the circuit to the contact assembly only when a card is correctly positioned in the compartment 64 and the cover 72 closed. A condenser 220 is connected across the terminals of this card switch in order to absorb the sparking at the switch contacts in case the cover is opened while the machine is working. Also in series with this feeder line is a cam operated switch 221 which opens and closes six times for every revolution of the cam 222.

This cam is mounted on shaft 14 and rotates continuously, engaging an insulator fastened to the lower contact spring of the contacts 221. A suitable bracket 238 secures this switch to the side of the speed reduction housing 13.

In series with each lead from the contacts 89 is another series of contacts 223, all of which are operated by a relay winding 224 which, in turn, is controlled by a toggle switch 225 located on the keyboard (Fig. 1). This multi-point relay is quite similar to the transfer switch used in ordinary punches and is mounted in a similar manner. When the contacts of the switch 225 are open, there is no current through the relay windings 224 and all the switch contacts 223 are closed. This is the condition for duplicating action since each of the twelve contacts 89 are thereby connected to one of the solenoids which control a punch position.

When the contacts 223 are to be opened, thus placing the machine in condition for manual operation, the switch 225 is closed, completing a circuit from the positive lead 100, through the contacts of switch 225 through the auxiliary contacts 226 and thence through the upper and lower windings of relay 224 which are of low resistance and the center winding which is of high resistance. This gives a strong magnetic impulse to the armature which opens all the contacts including the pair 226. In its actuated position, the low resistance windings are opened but a holding circuit still exists through the central high resistance winding which is sufficient to keep the contacts open.

When the machine is to copy data from a master card and transfer the said data to a field of set bars, the operation is as follows: The carriage is moved to the marginal stop which leaves it one space to the left of the first contact position. The master card is then put into the card compartment and the cover closed. The automatic action is started by the depression of one of the space keys which actuates the associated code relay, upper, lower, or column, and advances the carriage one space to the first data column. In this position, all twelve of the rollers 86 press upwardly against correspondingly situated sensing pins 80. The contact springs 88 provide a spring tension which will force the sensing pins through the card if any data holes have been punched in their respective positions and in so doing close the contact points. This action completes a circuit which is traced from the positive lead 100, over lead 144 through the winding of the erase relay 113, thence by lead 114 to the interrupter contacts 221, thence through the card switch contacts 94 to the feeder line 219 and then through the contacts which have been established by the above mentioned mechanism. The circuit continues through the associated contacts 223 on the duplicating switch and thence to the selected solenoid or solenoids, which, by means of their Bowden wire connections, cause the levers 30 in the setting carriage 25 to latch down the bars 28 in the set-bar field. From the solenoids the circuit proceeds by lead 228 or 116 or both to one of the space key controlled relays, column 97, upper 109, or lower 107, and thence to the negative lead 104 by way of lead 102 and contacts 103.

Whenever one of the setting levers 30 is actuated, a space bail 240 (Fig. 2) is rocked, an amount sufficient to trip the escapement and advance the carriage one space. The adjustments on the space bail are such that the spacing operation is started at the end of the setting operation so that there will be ample time to securely latch down the set-bars before the carriage moves to the next column.

Since the energizing current must pass through the intermittent contacts 221, the solenoid action will be started when these contacts are made by one of the six projections on the cam wheel 222. The contacts are adjusted so that their duration is long enough to complete the setting operation and start the spacing operation. However, the break is made before the carriage has moved any appreciable distance since it is safer to break the current at the contacts 221 rather than the contacts 89.

The shaft to which the cam 222 is attached turns at approximately 100 revolutions per minute; hence the duplicating operation proceeds at six times this rate or 600 characters per minute which is considerably faster than the speed of the average typist.

The intermittent contacts 221, which supply the energizing current to the contacts 89 and the operating solenoids, are in series with the winding of the erase relay 113; hence at each surge of current through the duplicating contacts, both erase contacts 118 and 122 are closed and, if the column code is being used, both erase solenoids are actuated. This erase action occurs just before each setting operation whether it is needed or not because there is no way of determining the holes to be punched prior to the actual sensing operation and also insures that no prior setting remains in the mechanism.

If, during the duplication process, a column is sensed in which there are no punched holes, the process stops since there is no means of actuating the space solenoid nor the escapement bail. The operator of the machine must then depress one of the space keys one or more times until the sensing pins again sense a hole and the duplicating action is taken up again.

The stopping of the duplicating action by a blank space in the master card gives the operator an opportunity of changing the code by depressing a space key different from the one used to start the operation.

When all the data to be duplicated has been transferred from the master card to the set-bar field, the operator may continue the data-setting operations by manually operating the keys in the keyboard 21. As long as the master card contains no holes in the area traversed, the manual operation may proceed without opening the relay contacts 223. However, if there happen to be some perforations in the master card which are not to be duplicated, it will be necessary to open the contacts 223 by closing the switch 225, thus operating the relay 224.

The provision for alternate usage of such a machine is advantageous when a considerable number of cards are to contain data, some of which is identical to all. This identical data may be a date, a car number, or a lot number if the date refers to merchandise, or it may be a premium date or policy total, if the machine is being used for insurance work.

In Fig. 4 are shown an example of a master card 81 and a duplicate card 232. In these cards the first field 233 is used for the date and the second 234 for the division. These fields are copied automatically from the master card 81 as is also the field 236 which denotes the commodity. The fields 235 and 237 are for the customer's number and the amount and must be added to card 232 by means of the keyboard.

The invention provides a machine which may be operated automatically or manually and is so constructed as to permit quick and easy changes of the data which controls the automatic feature.

While we have described what we consider to be a highly desirable embodiment of our invention, it is obvious that many changes in form could be made without departing from the spirit of our invention, and we, therefore, do not limit ourselves to the exact form herein shown and described, nor to anything less than the whole of our invention as hereinbefore set forth, and as hereinafter claimed.

What we claim as new, and desire to secure by Letters Patent, is:

1. In a card punch of the class described, the combination of a sensing compartment for a master card, and means of transferring the data from said master card to a set-bar field, said means comprising a plurality of sensing pins adapted to engage the holes of said master card, and a movable contacting carriage adapted to directly engage the ends of the said sensing pins, one column at a time, with contacting lever members, said members adapted to close electrical circuits which will cause the setting up of the same data in a set-bar field.

2. In a card punch of the class described, the combination of a set-bar field, a gang punch controlled by the settings of said set-bars, a setting carriage operated by electromagnetic mechanism, a keyboard operating means with a sensing chamber operating means, both of said operating means causing the electromagnetic mechanism to set up data in a set-bar field, and switching means controlled by the depression of a spacing key for changing from one operating means to the other operating means.

3. In a card punch of the class described, the combination of a setting carriage, a set-bar field, a plurality of punches adapted to deliver data to a card by punching holes therein, means for segregating the punched data into upper and lower zones, said means comprising three switching relays for determining the proper electromagnetic control of the setting carriage, each of said relays being provided with a holding circuit and contacts which are conducting when the relay is in the normal or open position, and means for allowing only one of said relays to be held in the actuated position, said means comprising a series connection of the holding circuit of each relay with the normally closed contacts of the other two relays.

4. In a card punch of the class described, a setting carriage, a set-bar field, the setting of which determines the position of punched data, an upper and lower zone in said set-bar field for the segregation of data, a plurality of relays for switching from one zone to another zone, keys for operating said relays and a plurality of holding circuits with means for allowing only one of said relays to be held in the actuated position, said means comprising a series connection of the holding circuit of each relay with the normally closed contacts of the other relays.

5. In a card punch of the class described, the combination of a set-bar field having a plurality of columns, a gang punch operable in accordance with the settings thereof, a carriage spaceable thereover adapted to effect settings in the set-bar field, a sensing compartment for a master card, means for transferring data from said master card to said carriage, said means comprising a plurality of sensing pins adapted to engage holes in said master card, and a movable contacting carriage adapted to directly engage the ends of the sensing pins, one column at a time, with contacting lever members, said members adapted to close electrical circuits which will cause the setting up of the same data in the set-bar field.

6. In a card punch of the class described, the combination of a plurality of punches for perforating a card, a plurality of settable pins for operating said punches, a sensing compartment for a master card, a plurality of sensing pins adapted to sense data in said master card, a carriage having contacting levers thereon adapted to directly engage the ends of said sensing pins, one column at a time, and electrical circuit means for transferring the sensed data from the carriage to the settable pins.

7. In a card punch of the class described, a set-bar field, a gang punch operable in accordance with the settings of said set-bars, a sensing chamber for a master card, a plurality of sensing pins adapted to engage data holes in said master card, and means for transferring the sensed data from said sensing chamber to said set-bar field, said means comprising a contacting carriage adapted to directly engage the ends of the sensing pins, one column at a time, with contacting lever members, said members adapted to cause the setting up of the same data in the set-bar field by electromagnetic means.

8. In a card punch of the class described, a series of punches for perforating a card, a set-bar field for controlling the actions of said punches, a setting carriage which travels above the set-bar field and delivers data thereto, a sensing chamber for a master card, a plurality of sensing pins within said sensing chamber adapted to sense the data in the master card, and a plurality of movable contacting members attached to said carriage with means for directly engaging said sensing pins with said contacting members, and means for completing a circuit for every hole sensed in the master card.

RAYMOND E. RICE.
WALTER F. KELLEY.